US010125995B2

(12) United States Patent
Kohli

(10) Patent No.: US 10,125,995 B2
(45) Date of Patent: Nov. 13, 2018

(54) FIREBOX BASKET SYSTEM FOR A GRILL

(71) Applicant: Ashish Kohli, Atlanta, GA (US)

(72) Inventor: Ashish Kohli, Atlanta, GA (US)

(73) Assignee: TRANSWORLD IMPORTS, INC., Suwanee, GA (US)

( * ) Notice: Subject to any disclaimer, the term of this patent is extended or adjusted under 35 U.S.C. 154(b) by 35 days.

(21) Appl. No.: 15/480,827

(22) Filed: Apr. 6, 2017

(65) Prior Publication Data

US 2017/0370593 A1  Dec. 28, 2017

Related U.S. Application Data

(60) Provisional application No. 62/318,956, filed on Apr. 6, 2016.

(51) Int. Cl.
| | | |
|---|---|---|
| F24C 3/00 | (2006.01) | |
| F24B 1/195 | (2006.01) | |
| A47J 37/06 | (2006.01) | |
| A47J 37/07 | (2006.01) | |

(52) U.S. Cl.
CPC ............... *F24B 1/195* (2013.01); *A47J 37/06* (2013.01); *A47J 37/0786* (2013.01); *F24C 3/00* (2013.01)

(58) Field of Classification Search
CPC ... F24B 1/195; F24C 3/07; A47J 37/06; A47J 37/07
USPC ............................ 126/30, 276, 41 R; 99/259
See application file for complete search history.

(56) References Cited

U.S. PATENT DOCUMENTS

| | | | | | |
|---|---|---|---|---|---|
| 4,735,135 | A | * | 4/1988 | Walker ................... | A47J 43/18 99/415 |
| 4,788,962 | A | * | 12/1988 | Mashburn ........... | A47J 37/0713 126/25 R |
| 5,359,988 | A | * | 11/1994 | Hait ..................... | A47J 37/0704 126/153 |
| 5,413,087 | A | * | 5/1995 | Jean ......................... | F24C 3/14 126/38 |
| 5,598,834 | A | * | 2/1997 | Grady ................ | A47J 37/0704 126/276 |
| 5,638,808 | A | * | 6/1997 | Home ................. | A47J 37/0713 126/25 R |
| 5,797,386 | A | * | 8/1998 | Orr ..................... | A47J 37/0704 126/25 A |
| 6,929,001 | B2 | * | 8/2005 | Yoon ................... | A47J 37/0704 126/25 AA |
| 7,383,836 | B2 | * | 6/2008 | Klemming .............. | F24B 1/181 126/190 |
| 9,198,538 | B2 | * | 12/2015 | Safar ................... | A47J 37/0754 |
| 9,844,300 | B2 | * | 12/2017 | Cedar ................. | A47J 37/0754 |

* cited by examiner

*Primary Examiner* — Gregory Huson
*Assistant Examiner* — Nikhil Mashruwala
(74) *Attorney, Agent, or Firm* — Nelson Mullins Riley & Scarborough LLP

(57) ABSTRACT

A firebox basket system for use in a firebox of a grill, including a bowl-shaped basket formed of annular rings of metal, the bowl-shaped basket including a pair of opposed divider supports secured to an inner surface of the basket, a flat bottom plate disposed in a bottom portion of the basket, and a divider plate having a pair of side edges that extend between a top and a bottom edge of the divider plate, wherein the side edges of the divider plate are slidably received in the divider supports, thereby dividing an interior volume of the basket into equal halves.

14 Claims, 6 Drawing Sheets

FIREBOX BASKET SYSTEM FOR A GRILL

CLAIM OF PRIORITY

This application claims priority to U.S. Provisional Patent Application No. 62/318,956, filed Apr. 6, 2016, the entire disclosure of which is incorporated herein.

FIELD OF THE INVENTION

The present invention relates generally to devices for the preparation of food items and, more specifically, to firebox systems for grills to facilitate both igniting and maintaining fuel sources for cooking therein.

SUMMARY OF THE INVENTION

An embodiment of the present disclosure provides a firebox basket system for use in a firebox of a grill, including a bowl-shaped basket formed of annular rings of metal, the bowl-shaped basket including a pair of opposed divider supports secured to an inner surface of the basket, a flat bottom plate disposed in a bottom portion of the basket, and a divider plate having a pair of side edges that extend between a top and a bottom edge of the divider, wherein the side edges of the divider plate are slidably received in the divider supports, thereby dividing an interior volume of the basket into equal halves.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
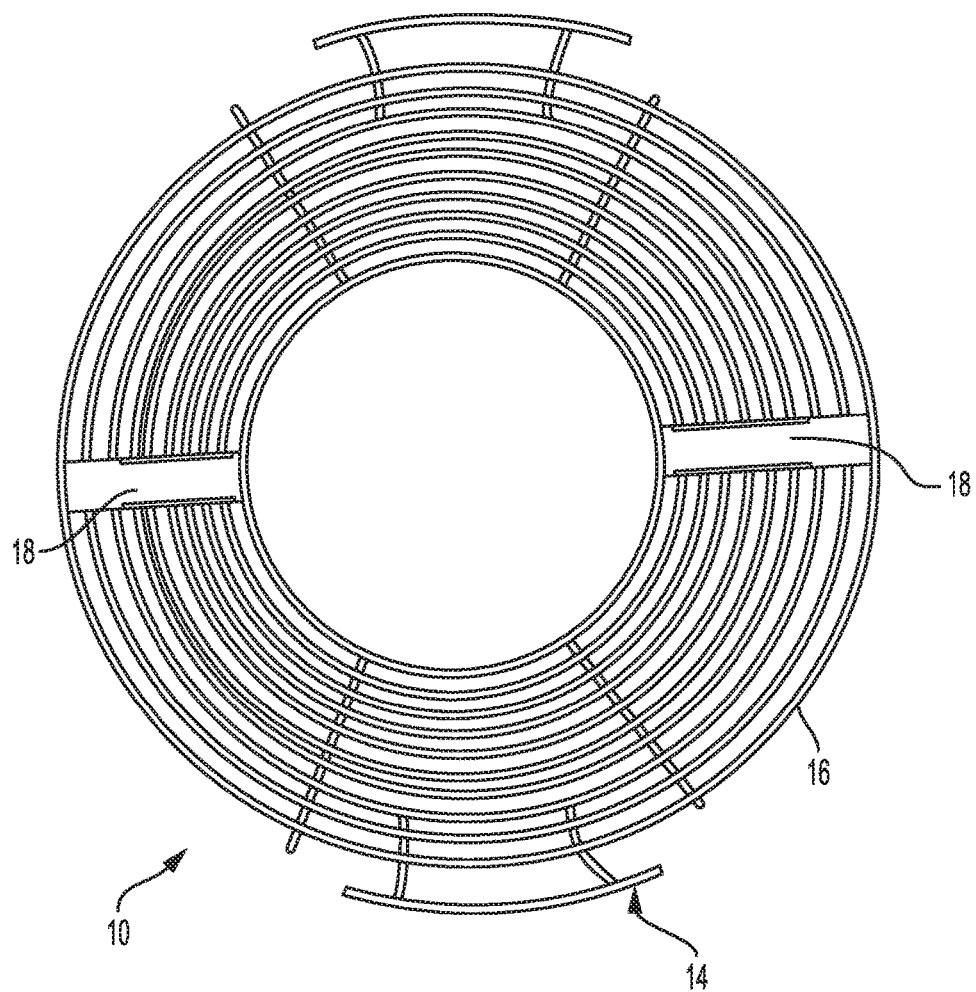
FIG. 1 is a top plan view of an embodiment of a firebox basket system in accordance with the present disclosure.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
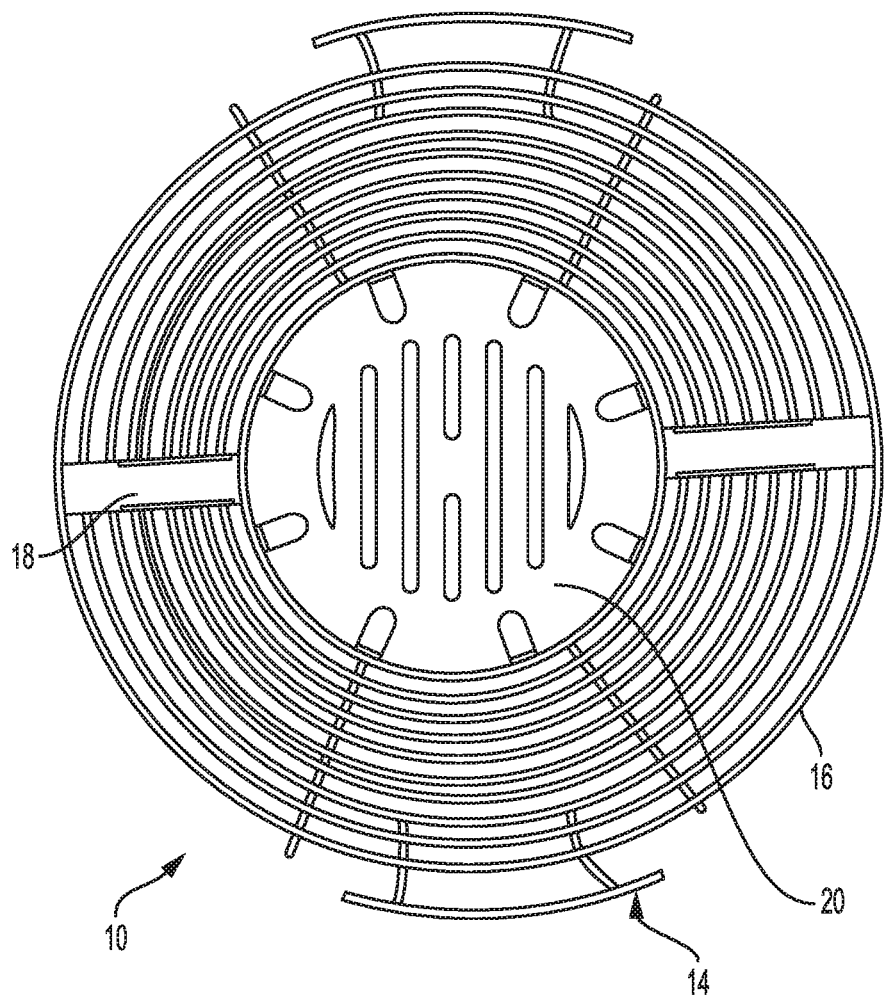
FIG. 2 is a top plan view of the firebox basket system shown in FIG. 1, including a bottom plate.

Referring to the figures, the present disclosure is related to a firebox basket system 11 for use in a firebox 22 of a grill 12. Preferably, the firebox basket system 11 includes a firebox basket 10, a fire can 30 and a firebox divider plate 40. As best seen in FIGS. 1 and 2, firebox basket 10 includes a bowl-shaped body 16 that includes a pair of handles 14 extending outwardly therefrom, and a pair of divider supports 18 that are disposed opposite each other within the inside of body 16. Firebox basket 10 is preferably formed of stainless steel wire and has an open bottom end. The bottom end of the basket's body 16 is configured to support a bottom plate 20, as shown in FIG. 2, that is preferably a grate with openings to allow airflow therethrough, as well as allow ash to pass downwardly therethrough. Divider supports 18 are U-shaped channels that are configured to slidably receive opposing side edges 42 of firebox divider plate 40, as is shown in FIGS. 5A through 5C and FIG. 6.

Figure 3:
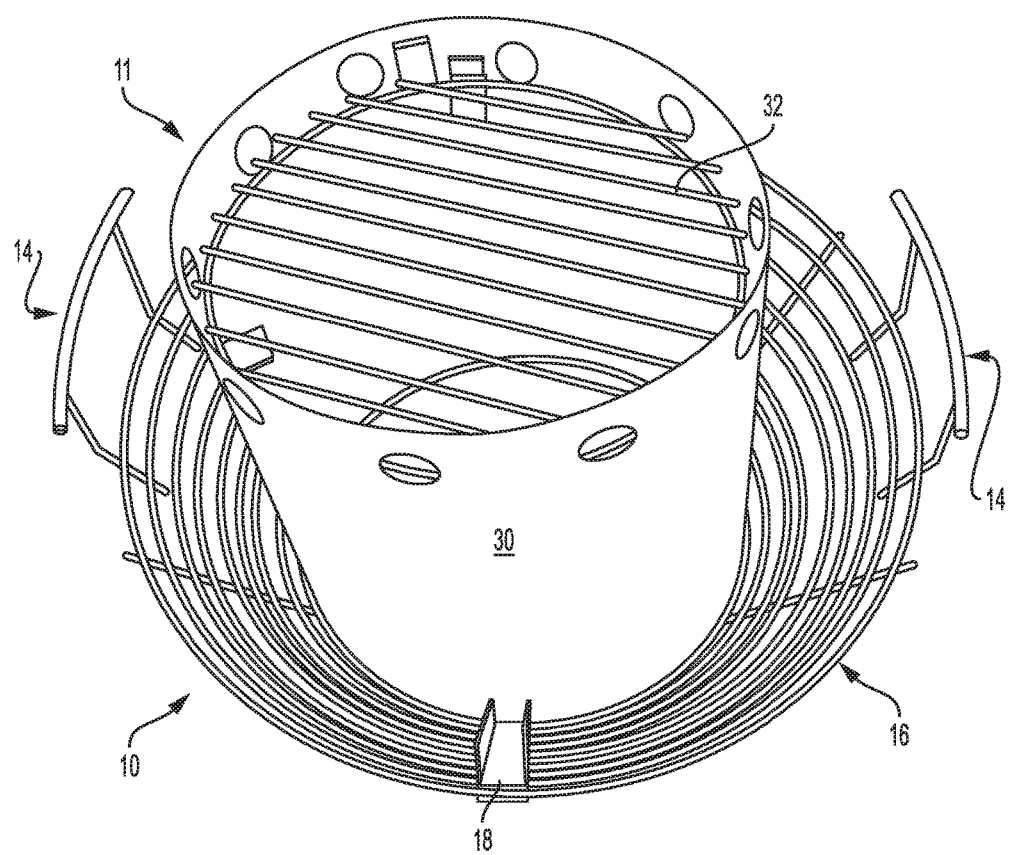
FIG. 3 is a perspective view of the firebox basket system shown in FIG. 1, including a cylindrical fire can.
Figure 4:
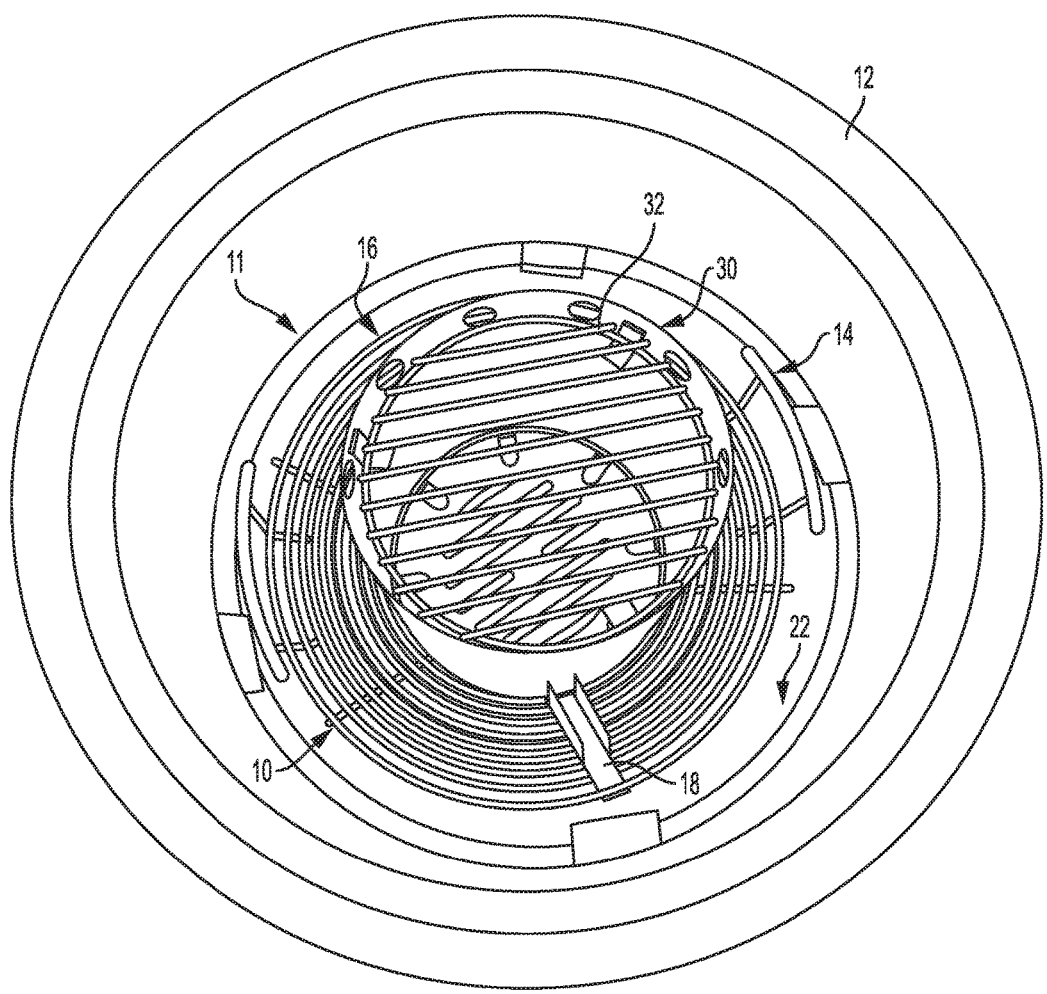
FIG. 4 is a perspective view of the firebox basket system shown in FIG. 1, including a cylindrical fire can.

Referring now to FIGS. 3 and 4, firebox basket 10 also includes a cylindrical fire can 30 that is removably received within body 16. Fire can 30 may be used either with or without bottom plate 20 being present in basket 10, depending upon its use. Fire can 30 also includes top panel 32, or stainless steel grate, that is removably received adjacent its upper perimeter. As well, fire can 30 is vented to allow for even heat distribution throughout firebox 22 (FIG. 4) of the grill. In alternate embodiments, fire can 30 includes a bottom plate secured to its bottom end as well as a top plate that may be opened and closed, yet remains attached to fire can 30. As such, coal or wood can be completely secured within fire can 30.

Figure 5A:
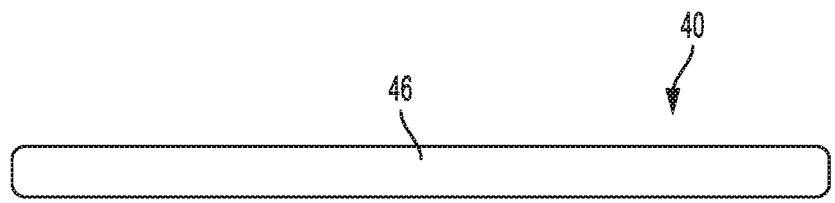
FIGS. 5A through 5C are top, side and bottom plan views of a firebox divider plate for use with the firebox basket system shown in FIG. 1.
Figure 5B:
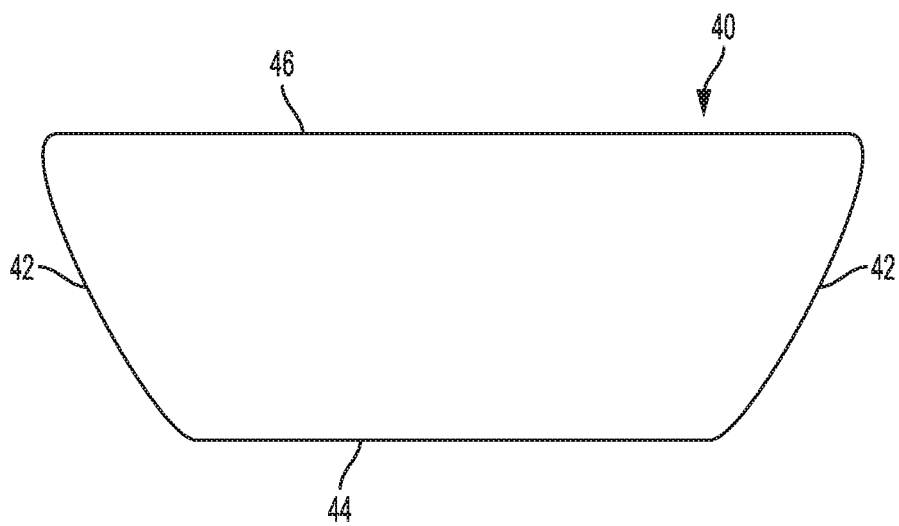
Figure 5C:
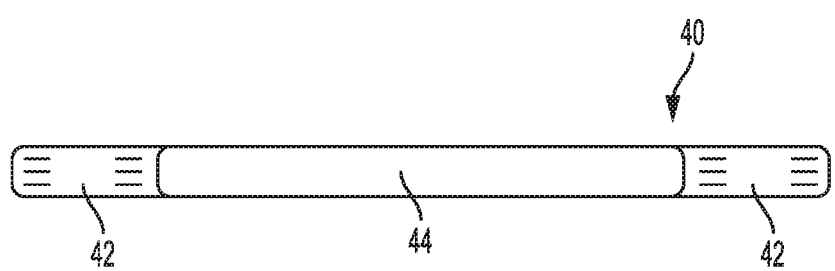
Figure 6:
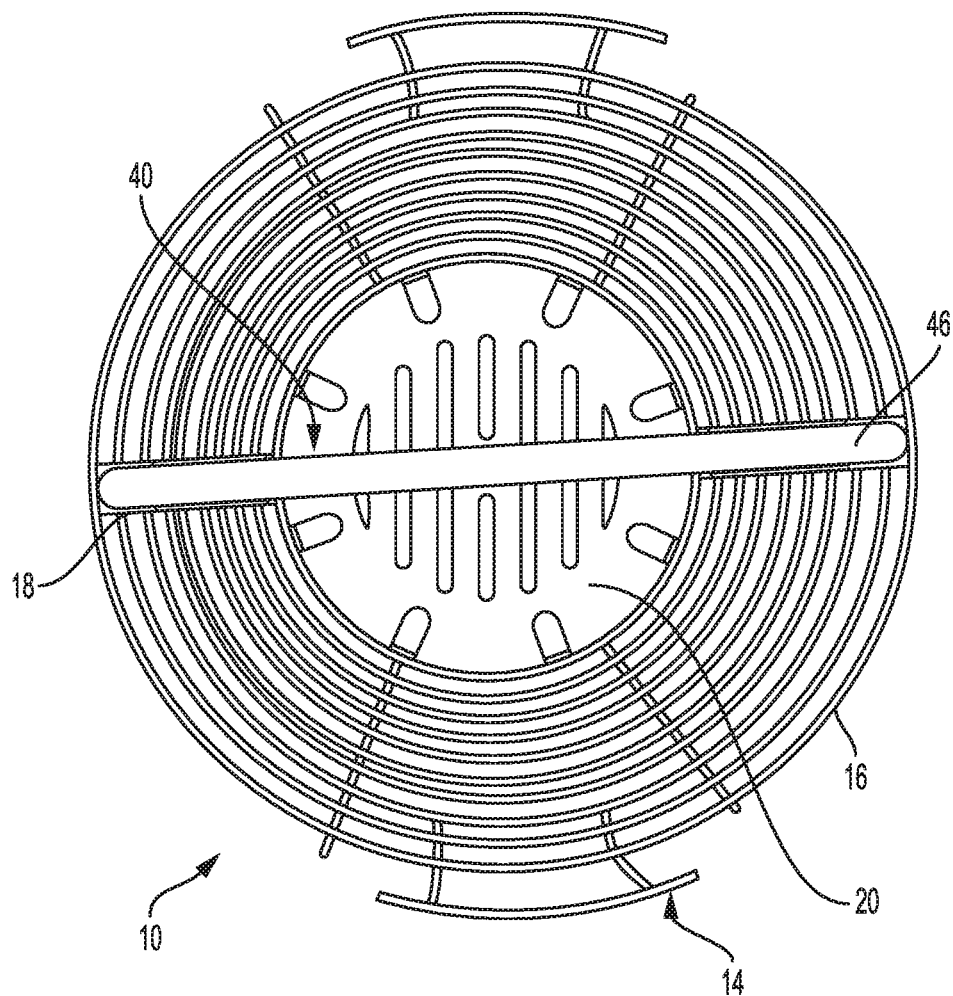
FIG. 6 is a top plan view of the firebox divider shown in FIGS. 5A through 5C installed in the firebox basket system shown in FIG. 2.

Referring specifically to FIGS. 5A through 5C, firebox divider plate 40 includes a pair of curved side edges 42, and top and bottom edges 46 and 44, respectively, that extend therebetween. As shown, the shape of side edges 42 conforms to the shape of the basket's side walls, so that they are slidably receivable within divider supports 18, as shown in FIG. 6. As shown, bottom edge 44 of firebox divider plate 40 is preferably straight so that it may be used when bottom plate 20 is present in firebox basket 10. Preferably, firebox divider plate 40 is formed of a ceramic material similar to that which is used to construct firebox 22 of grill 12. Note, however, other materials may be used.

In the configuration shown in FIG. 2, firebox basket 10 may be used to hold charcoal as it burns in firebox 22 of grill 12. As such, a user may remove firebox basket 10 from an operating grill with handles 14, and place firebox basket 10 in an alternate grill that he desires to use. For example, a second grill of a different size may still be designed to receive firebox basket system 11 therein. As well, firebox basket 10 may be removed from an operating grill simply to facilitate shutting the grill down. Referring additionally to FIGS. 5A through 5C, firebox divider plate 40 may be secured in firebox basket 10 with divider supports 18, thereby allowing lit charcoal to be maintained in only one half of firebox 22. This facilitates indirect cooking as food items may be placed over the empty side of firebox 22. As shown in FIGS. 3 and 4, fire can 30 may be used in conjuncture with firebox basket 10 to receive charcoal therein. This allows a reduced amount of charcoal to be utilized than is necessary to fill the entire firebox 22.

Alternately, when using the grill in a smoking mode, chunks of wood may be placed within fire can 30, whereas charcoal is disposed in firebox basket 10 between its body 16 and the outer surface of fire can 30.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

What is claimed is:

1. A firebox basket system for use in a firebox of a grill, comprising:
    a firebox basket including a bowl-shaped body formed of annular rings of metal, the bowl-shaped body including a pair of opposed divider supports secured to an inner surface of the basket, each divider support having a U-shaped cross-section;
    a flat bottom plate disposed in a bottom portion of the basket; and
    a divider plate having a pair of side edges that extend between a top and a bottom edge of the divider plate, a shape of each side edge of the divider plate conforming to a shape of a side wall of the bowl-shaped body of the firebox basket,
    wherein each side edge of the divider plate is slidably received in a corresponding divider support, thereby dividing an interior volume of the basket into equal halves.

2. The firebox basket system of claim 1, further comprising a cylindrical fire can that is selectively positionable within the firebox basket.

3. The firebox basket system of claim 2, wherein the fire can further includes an upper grate disposed adjacent its upper end.

4. The firebox basket system of claim 3, wherein the fire can further includes a bottom plate disposed adjacent its bottom end.

5. The firebox basket system of claim 1, wherein the divider plate is formed of a ceramic material.

6. The firebox basket system of claim 5, wherein the firebox of the grill is formed of a ceramic material.

7. The firebox basket system of claim 1, wherein the firebox basket further comprises a pair of opposing handles extending outwardly from the bowl-shaped body.

8. A firebox basket system for use in a firebox of a grill, comprising:
    a firebox basket including a bowl-shaped body formed of annular rings of metal, the bowl-shaped body including a pair of opposed divider supports secured to an inner surface of the basket, each divider support having a U-shaped cross-section;
    a cylindrical fire can that is selectively positionable within the firebox basket; and
    a divider plate having a pair of side edges that extend between a top and a bottom edge of the divider plate, a shape of each side edge of the divider plate conforming to a shape of a side wall of the bowl-shaped body of the firebox basket,
    wherein each side edge of the divider plate is slidably received in a corresponding divider support, thereby dividing an interior volume of the basket into equal halves.

9. The firebox basket system of claim 8, wherein the fire can further includes an upper grate disposed adjacent its upper end.

10. The firebox basket system of claim 9, wherein the fire can further includes a bottom plate disposed adjacent its bottom end.

11. The firebox basket system of claim 8, further comprising a flat bottom plate disposed in a bottom portion of the basket.

12. The firebox basket system of claim 8, wherein the divider plate is formed of a ceramic material.

13. The firebox basket system of claim 12, wherein the firebox of the grill is formed of a ceramic material.

14. The firebox basket system of claim 9, wherein the firebox basket further comprises a pair of opposing handles extending outwardly from the bowl-shaped body.

* * * * *